(12) United States Patent
Py

(10) Patent No.: US 9,102,097 B2
(45) Date of Patent: Aug. 11, 2015

(54) RESEALABLE MEMBER AND METHOD OF RESEALING SAME

(75) Inventor: Daniel Py, Larchmont, NY (US)

(73) Assignee: MedInstill Development LLC, New Milford, CT (US)

( * ) Notice: Subject to any disclaimer, the term of this patent is extended or adjusted under 35 U.S.C. 154(b) by 665 days.

(21) Appl. No.: 13/396,053

(22) Filed: Feb. 14, 2012

(65) Prior Publication Data

US 2013/0020321 A1    Jan. 24, 2013

Related U.S. Application Data

(63) Continuation of application No. 12/715,821, filed on Mar. 2, 2010, now Pat. No. 8,112,972, which is a continuation of application No. 11/074,454, filed on Mar. 7, 2005, now Pat. No. 7,669,390, and a continuation of application No. 11/074,513, filed on Mar. 7, 2005, now Pat. No. 7,707,807.

(60) Provisional application No. 60/551,565, filed on Mar. 8, 2004.

(51) Int. Cl.
| | |
|---|---|
| *B65B 3/00* | (2006.01) |
| *B65B 7/28* | (2006.01) |
| *B29C 67/00* | (2006.01) |
| *B29C 45/00* | (2006.01) |

(Continued)

(52) U.S. Cl.
CPC .............. *B29C 67/004* (2013.01); *B29C 45/006* (2013.01); *B29C 45/1701* (2013.01); *B29C 66/001* (2013.01); *B29C 66/91212* (2013.01); *B29C 66/91216* (2013.01); *B29C 66/91221* (2013.01); *B29C 66/91411* (2013.01); *B29C 66/91431* (2013.01); *B29C 66/961* (2013.01);
*B65B 3/003* (2013.01); *B65B 3/022* (2013.01); *B65B 55/06* (2013.01); *B29C 45/42* (2013.01); *B29C 66/0018* (2013.01); *B29C 2791/005* (2013.01); *B29L 2031/565* (2013.01)

(58) Field of Classification Search
USPC ................... 53/471, 476–478; 215/247, 249, 215/355–364; 220/361, 363; 604/415
See application file for complete search history.

(56) References Cited

U.S. PATENT DOCUMENTS

| | | | |
|---|---|---|---|
| 3,325,860 A | 6/1967 | Hansen | |
| 3,409,710 A | 11/1968 | Klygis | |

(Continued)

FOREIGN PATENT DOCUMENTS

| | | |
|---|---|---|
| FR | 2 509 689 | 7/1981 |
| GB | 500354 | 2/1939 |

(Continued)

OTHER PUBLICATIONS

International Search Report and Written Opinion of the International Searching Authority for International Application No. PCT/US05/07916 dated Jul. 20, 2005.

*Primary Examiner* — Stephen F Gerrity
(74) *Attorney, Agent, or Firm* — McCarter & English, LLP

(57) ABSTRACT

A stopper and container body are molded in the same molding machine. An assembly device, such as a pick and place robot, transfers the stopper from one mold cavity into the opening in the container body located within another mold cavity, or vice versa, to assemble the stopper and container body. Then, the assembled container body and stopper are removed from the molding machine and transported to a needle filling and laser resealing station for filling and laser resealing. A laminar flow source directs a substantially laminar flow of air or sterile gas over the mold surfaces, stoppers and container bodies, and assembly device, to prevent contamination during assembly.

30 Claims, 8 Drawing Sheets

(51) Int. Cl.
  *B29C 45/17* (2006.01)
  *B29C 65/00* (2006.01)
  *B65B 3/02* (2006.01)
  *B65B 55/06* (2006.01)
  *B29L 31/56* (2006.01)
  *B29C 45/42* (2006.01)

(56) References Cited

U.S. PATENT DOCUMENTS

| | | | |
|---|---|---|---|
| 3,911,640 A | 10/1975 | Rausing | |
| 4,079,850 A | 3/1978 | Suzuki et al. | |
| 4,134,300 A | 1/1979 | Svensson | |
| 4,208,852 A | 6/1980 | Pioch | |
| 4,401,423 A | 8/1983 | Bellehache et al. | |
| 4,419,323 A | 12/1983 | Winchell | |
| 4,543,770 A | 10/1985 | Walter et al. | |
| 4,628,969 A | 12/1986 | Jurgens | |
| 4,790,117 A | 12/1988 | Hansen | |
| 4,815,619 A | 3/1989 | Turner et al. | |
| 5,000,804 A | 3/1991 | Nugent | |
| 5,037,597 A | 8/1991 | McMinley et al. | |
| 5,067,532 A | 11/1991 | Lang et al. | |
| 5,069,017 A | 12/1991 | Fabricius | |
| 5,127,211 A | 7/1992 | Mancini | |
| 5,129,212 A | 7/1992 | Duffey et al. | |
| 5,341,854 A | 8/1994 | Zezulka et al. | |
| 5,344,036 A | 9/1994 | Stanescu et al. | |
| 5,353,573 A | 10/1994 | Durrant | |
| 5,423,160 A | 6/1995 | Rosén | |
| 5,431,201 A | 7/1995 | Torchia et al. | |
| 5,597,530 A | 1/1997 | Smith | |
| 5,601,214 A | 2/1997 | Hendrickson | |
| 5,641,004 A | 6/1997 | Py | |
| 5,669,208 A | 9/1997 | Tabaroni et al. | |
| 5,687,542 A | 11/1997 | Lawecki | |
| 5,744,082 A | 4/1998 | Bak | |
| 6,065,270 A | 5/2000 | Reinhard et al. | |
| 6,068,150 A | 5/2000 | Mitchell et al. | |
| 6,094,890 A | 8/2000 | Meichellon et al. | |
| 6,096,358 A | 8/2000 | Murdick et al. | |
| 6,119,433 A | 9/2000 | Kitahora et al. | |
| 6,134,866 A | 10/2000 | Schoenewolff et al. | |
| 6,145,277 A | 11/2000 | Lawecki et al. | |
| 6,145,688 A | 11/2000 | Smith | |
| 6,156,842 A | 12/2000 | Hoenig et al. | |
| 6,164,044 A | 12/2000 | Porfano et al. | |
| 6,165,402 A | 12/2000 | Gabbard et al. | |
| 6,189,292 B1 | 2/2001 | Odell et al. | |
| 6,263,641 B1 | 7/2001 | Odell et al. | |
| 6,308,847 B1 | 10/2001 | Andersson et al. | |
| RE37,471 E | 12/2001 | Jagger | |
| 6,326,010 B1 | 12/2001 | Sano et al. | |
| RE37,676 E | 4/2002 | Abrams et al. | |
| 6,364,864 B1 | 4/2002 | Mohiuddin et al. | |
| 6,475,435 B1 | 11/2002 | Taggart | |
| 6,536,188 B1 | 3/2003 | Taggart | |
| 6,568,439 B1 | 5/2003 | Se et al. | |
| 6,604,561 B2 * | 8/2003 | Py | 215/247 |
| 6,622,457 B2 | 9/2003 | Kurth | |
| 6,681,475 B2 | 1/2004 | Thibault et al. | |
| 6,684,916 B2 | 2/2004 | Py | |
| 6,779,318 B2 | 8/2004 | Wang | |
| 6,805,170 B2 * | 10/2004 | Py | 53/403 |
| 6,929,040 B2 | 8/2005 | Py | |
| 7,032,631 B2 | 4/2006 | Py | |
| 7,096,896 B2 | 8/2006 | Py | |
| 7,100,646 B2 * | 9/2006 | Py et al. | 215/247 |
| 7,111,649 B2 | 9/2006 | Py | |
| 7,168,149 B2 | 1/2007 | Kalemba et al. | |
| 7,243,689 B2 | 7/2007 | Py | |
| 7,270,158 B2 | 9/2007 | Py | |
| 7,500,498 B2 * | 3/2009 | Py | 141/11 |
| 7,669,390 B2 | 3/2010 | Py | |
| 7,707,807 B2 | 5/2010 | Py | |
| 7,726,357 B2 * | 6/2010 | Py et al. | 215/247 |
| 7,967,034 B2 * | 6/2011 | Py | 53/426 |
| 8,347,923 B2 * | 1/2013 | Py | 53/426 |
| 2001/0010145 A1 | 8/2001 | Tawa et al. | |
| 2002/0023409 A1 | 2/2002 | Py | |
| 2002/0171179 A1 | 11/2002 | Dundas et al. | |
| 2003/0098286 A1 | 5/2003 | Bloom et al. | |
| 2003/0159750 A1 | 8/2003 | Py | |
| 2004/0256026 A1 | 12/2004 | Py | |
| 2005/0217211 A1 | 10/2005 | Py | |
| 2005/0223677 A1 | 10/2005 | Py | |
| 2006/0200968 A1 | 9/2006 | Thilly et al. | |

FOREIGN PATENT DOCUMENTS

| | | |
|---|---|---|
| GB | 984149 | 2/1965 |
| WO | WO 02/49821 A2 | 6/2002 |
| WO | WO 03/022313 A2 | 3/2003 |
| WO | WO 04/000100 A2 | 12/2003 |
| WO | WO 2004/014778 A2 | 2/2004 |

* cited by examiner

RESEALABLE MEMBER AND METHOD OF RESEALING SAME

CROSS-REFERENCE TO RELATED APPLICATIONS

This patent application is a continuation of U.S. patent application Ser. No. 12/715,821, filed Mar. 2, 2010, now U.S. Pat. No. 8,112,972, which is a continuation of U.S. patent application Ser. No. 11/074,454, filed Mar. 7, 2005, now U.S. Pat. No. 7,669,390, and a continuation of U.S. patent application Ser. No. 11/074,513, filed Mar. 7, 2005, now U.S. Pat. No. 7,707,807, both of which claim the benefit of U.S. Provisional Patent Application Ser. No. 60/551,565, filed Mar. 8, 2004, entitled "Apparatus And Method For Molding And Assembling Containers With Stoppers And Filling Same", all of which are hereby expressly incorporated by reference as part of the present disclosure. This patent application also includes subject matter related to that disclosed in the following patent applications: U.S. patent application Ser. No. 10/766,172 filed Jan. 28, 2004, entitled "Medicament Vial Having A Heat-Sealable Cap, And Apparatus and Method For Filling The Vial", now U.S. Pat. No. 7,032,631, which is a continuation-in-part of similarly titled U.S. patent application Ser. No. 10/694,364, filed Oct. 27, 2003, now U.S. Pat. No. 6,805,170, which is a continuation of similarly titled co-pending U.S. patent application Ser. No. 10/393,966, filed Mar. 21, 2003, now U.S. Pat. No. 6,684,916 which is a divisional of similarly titled U.S. patent application Ser. No. 09/781,846, filed Feb. 12, 2001, now U.S. Pat. No. 6,604,561, which, in turn, claims the benefit of similarly titled U.S. Provisional Application Ser. No. 60/182,139, filed Feb. 11, 2000; similarly titled U.S. Provisional Patent Application No. 60/443,526, filed Jan. 28, 2003; similarly titled U.S. Provisional Patent Application No. 60/484,204, filed Jun. 30, 2003; U.S. patent application Ser. No. 10/655,455, filed Sep. 3, 2003, entitled "Sealed Containers And Methods Of Making And Filling Same"; U.S. Provisional Patent Application Ser. No. 60/518,685, entitled "Needle Filling And Laser Sealing Station"; and the U.S. Provisional Patent Application No. 60/550,805 filed Mar. 5, 2004, entitled "Apparatus For Needle Filling And Laser Resealing". The foregoing patent applications and patent are assigned to the Assignee of the present invention and are hereby expressly incorporated by reference as part of the present disclosure.

FIELD OF THE INVENTION

The present invention relates to methods for molding containers having container bodies and stoppers for sealing openings in the container bodies, such as medicament vials or other container bodies having polymeric stoppers that are needle penetrable for filling the closed vial with a medicament or other substance therethrough and that are laser resealable for laser resealing the needle penetrated region of the stopper, and more particularly, to methods for molding and assembling such containers and stoppers under aseptic conditions.

BACKGROUND OF THE INVENTION

A typical medicament dispenser or other aseptically filled container includes a body defining a storage chamber, a fill opening in fluid communication with the body, and a stopper or cap for sealing the fill opening after filling the storage chamber to hermetically seal the medicament or other substance within the dispenser or container. In order to fill such prior art dispensers or containers with a sterile fluid or other substance, such as a medicament, it is typically necessary to sterilize the unassembled components of the dispenser or container, such as by autoclaving the components and/or exposing the components to gamma radiation. The sterilized components then must be filled and assembled in an aseptic isolator of a sterile filling machine. In some cases, the sterilized components are contained within multiple sealed bags or other sterile enclosures for transportation to the sterile filling machine. In other cases, the sterilization equipment is located at the entry to the sterile filling machine. In a filling machine of this type, every component is transferred sterile into the isolator, the storage chamber of the container is filled with the fluid or other substance, the sterilized stopper is assembled to the container to plug the fill opening and hermetically seal the fluid or other substance in the container, and then a crimping ring or other locking member is assembled to the container to secure the stopper thereto.

One of the drawbacks associated with such prior art dispensers or containers, and processes and equipment for filling such dispensers or containers, is that the filling process is time consuming, and the processes and equipment are expensive. Further, the relatively complex nature of the filling processes and equipment can lead to more defectively filled dispensers or containers than otherwise desired. For example, typically there are at least as many sources of failure as there are components. In many cases, there are complex assembly machines for assembling the dispensers or containers that are located within the aseptic area of the filling machine that must be maintained sterile. This type of machinery can be a significant source of unwanted particles. Further, such isolators are required to maintain sterile air within the barrier enclosure. In closed barrier systems, convection flow is inevitable and thus laminar flow, or substantially laminar flow, cannot be achieved. When operation of an isolator is stopped, a media fill test may have to be performed which can last for several, if not many days, and can lead to repeated interruptions and significant reductions in production output for the pharmaceutical, nutritional or other product manufacturer that is using the equipment. In order to address such production issues, government-imposed regulations are becoming increasingly sophisticated and are further increasing the cost of already-expensive isolators and like filling equipment. On the other hand, governmental price controls and marketplace competition for pharmaceuticals and vaccines, including, for example, preventative medicines, and other aseptically filled products, such as liquid nutrition products, discourage such major financial investments. Accordingly, there is a concern that fewer companies will be able to afford such increasing levels of investment in sterile filling machines, thus further reducing competition in the pharmaceutical, vaccine, and nutritional product marketplaces.

Some prior art sterile filling machines and processes employ gamma radiation to sterilize the container components prior to filling and/or to terminally sterilize the containers after filling in cases where the product is believed to be gamma radiation stable. One of the drawbacks of gamma sterilization is that it can damage or otherwise negatively affect the parts to be sterilized, such as by discoloring parts formed of plastic and other gamma-sensitive materials. In addition, if used to terminally sterilize filled containers, gamma radiation can damage the product stored within the container. Accordingly, gamma sterilization has limited applicability, and further, is not always a desirable form of sterilization for many types of products with which it is used.

Accordingly, it is an object of the present invention to overcome one or more of the above described drawbacks and disadvantages of the prior art.

SUMMARY OF THE INVENTION

The present invention is directed to a method of molding and assembling containers having container bodies defining openings in communication with interior chambers for receiving a substance therein, such as vials, and stoppers receivable within the openings for sealing the openings and substances received in the containers. The method comprises the following steps:
(a) molding a container body in a first mold cavity;
(b) molding a stopper in a second mold cavity; and
(c) assembling at least one of the container body and stopper to the other (i) at container body and stopper temperatures greater than an ambient temperature, and (ii) prior to or upon discharge of at least one of the container body and stopper from the respective mold cavity, and thereby forming substantially sterile, sealed container and stopper assemblies.

In a currently preferred embodiment of the present invention, the stopper and container body are molded in the same molding machine. The assembly device, such as a pick and place robot, transfers the stopper from one mold cavity into the opening in the container body located within another mold cavity, or vice versa. Then, the assembled container body and stopper are ejected or otherwise removed from the molding machine and transported to a needle filling and laser resealing station for filling and laser resealing. Preferably, a laminar flow source directs a substantially laminar flow of air or sterile gas over the mold surfaces, stoppers and container bodies, and assembly device, to prevent contamination during assembly.

One advantage of the present invention is that the sterile stoppers and container bodies are assembled, preferably under sterile laminar flow, either within the molding machine(s) or promptly upon discharge from the molding machine(s), while the parts are still hot and sterile. Thus, there is no need to gamma irradiate or otherwise sterilize at least the interiors of the containers after assembly.

Other objects and advantages of the present invention will become more readily apparent in view of the following detailed description of the currently preferred embodiments and accompanying drawings.

DETAILED DESCRIPTION OF EMBODIMENTS OF THE INVENTION

Figure 1A:
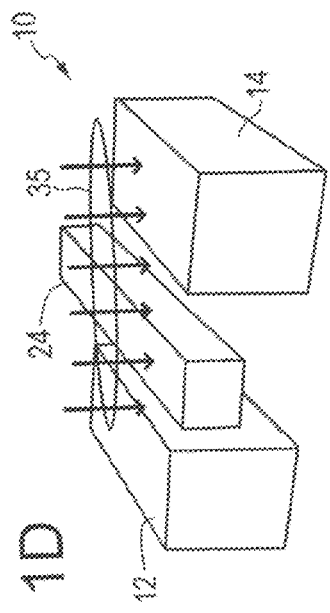
FIGS. 1A through 1F are somewhat schematic illustrations of the molds and assembly device of an apparatus embodying the present invention for molding needle penetrable and thermally resealable stoppers and container bodies, assembling the stoppers to the container bodies in the molding machine while the stoppers and container bodies are still hot and sterile, and then discharging the assembled stoppers and container bodies from the molding machine.
Figure 1B:
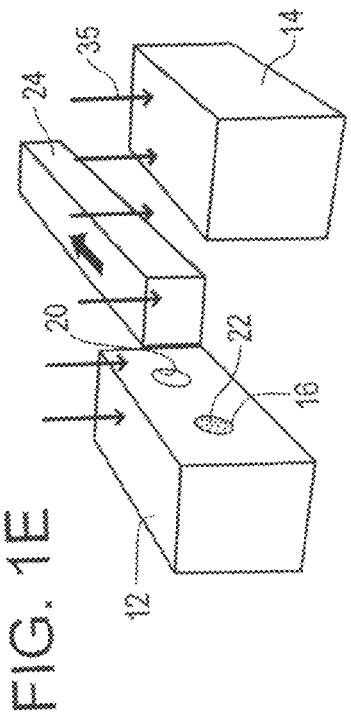
Figure 1C:
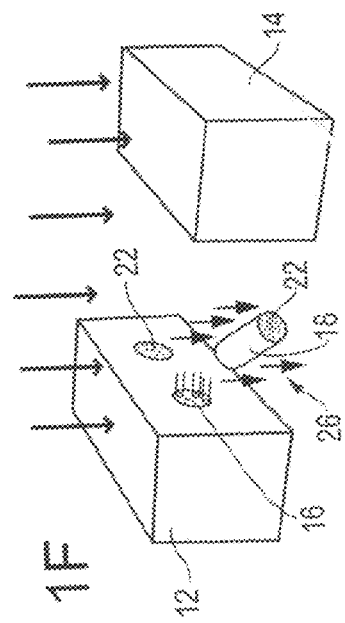
Figure 1D:
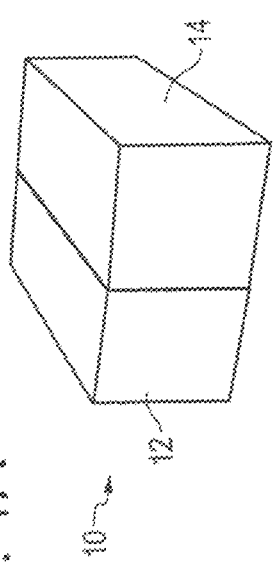
Figure 1E:
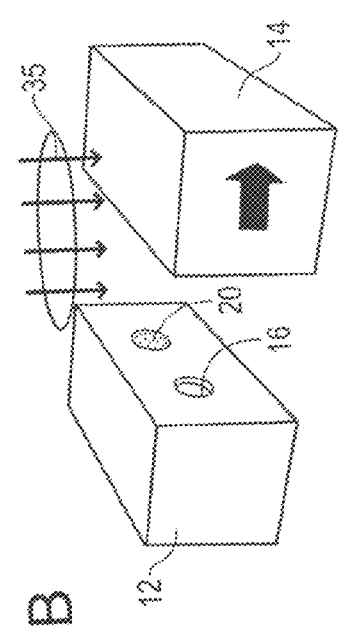
Figure 1F:
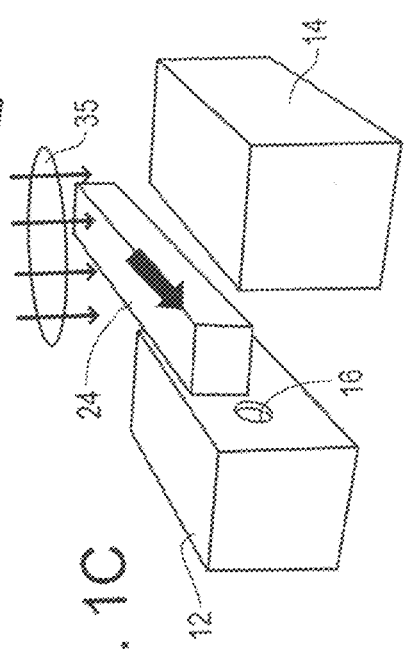

In FIGS. 1A through 1F, an apparatus embodying the present invention is indicated generally by the reference numeral 10. The apparatus 10 comprises a first mold or die 12, and a second mold or die 14. The first and second molds 12 and 14, respectively, are movable relative to one another in a manner known to those of ordinary skill in the pertinent art between a closed position for molding the container parts therein, and an open position for releasing the molded container parts therefrom. Although both molds 12 and 14 are shown as being movable relative to each other, if desired or otherwise required, only one of the molds may be movable relative to the other. In addition, each mold or die may comprise any desired number of parts, including, for example, moving parts, as may be desired or otherwise required. The first and second molds 12 and 14 cooperate to define a first mold cavity 16 that is shaped to form the container body 18, and a second mold cavity 20 that is shaped to form the stopper 22. Although only one of each mold cavity is illustrated, the apparatus 10 may define a plurality of such mold cavities in a manner known to those of ordinary skill in the pertinent art in order to increase production throughput and/or to otherwise efficiently manufacture the container assemblies. An assembly device 24 is located adjacent to the first and second mold cavities 12 and 14, respectively, and is movable relative thereto for assembling the substantially sterile stopper 22 formed within the second mold cavity 20 and the container body 18 formed within the first mold cavity 16 into a sterile or aseptic, sealed container and stopper assembly 26.

Figure 2:
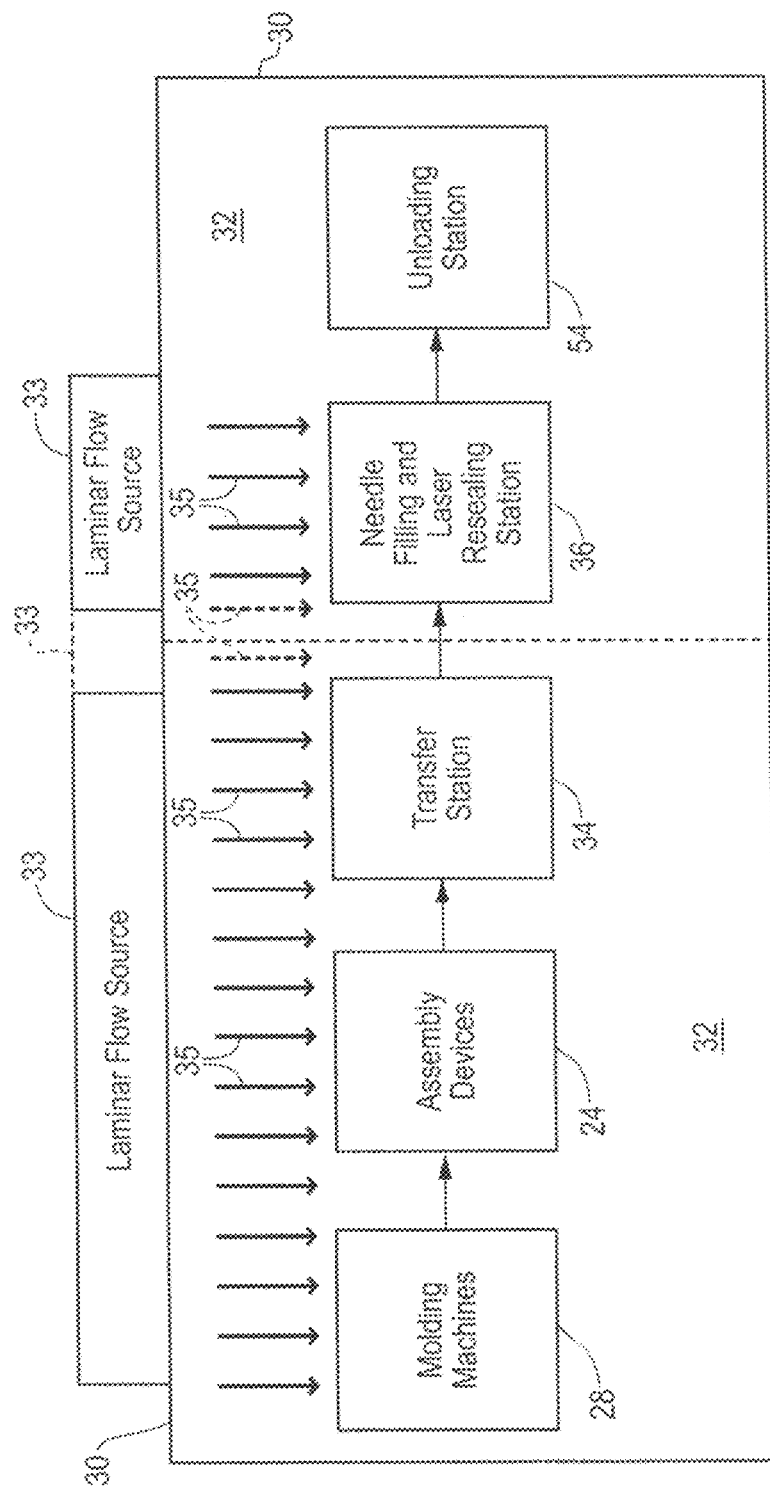
FIG. 2 is a schematic illustration of an apparatus embodying the present invention wherein the molds and assembly device of FIGS. 1A through 1F are mounted within a barrier enclosure, with substantially sterile laminar flow, and further including a container transfer station, needle filling and laser resealing station, and a container unloading station.

As shown in FIG. 2, the first and second molds are mounted within one or more molding machines 28, such as a plastic injection molding machine or other type of molding machine that is currently known, or that later becomes known for performing the function of the molding machine as disclosed herein. In the illustrated embodiment, the molding machine is a double barrel injection molding machine capable of delivering a first material or material blend to the first mold cavity or cavities 16 for forming the container bodies 18, and a second material or material blend to the second mold cavity or cavities for forming the stoppers 22. A barrier enclosure 30 of a type known to those of ordinary skill in the pertinent art surrounds or substantially surrounds the molding machine(s) 28 and defines an aseptic chamber 32. The relatively hot, sterile, stoppers and container bodies 22 and 18, respectively, are assembled within the aseptic chamber 32 prior to or upon discharge from the mold cavities 20 and 16, respectively, to form the sealed, sterile or aseptic stopper and container body assemblies 26.

As also shown in FIG. 2, one or more laminar flow sources 33 are coupled in fluid communication with the aseptic chamber 32 for directing a substantially laminar flow 35 of sterile air or other gas(es) into the chamber 32 and over the stoppers 22 and container bodies 18 during assembly thereof, and upon removal from the molds, to facilitate maintaining the sterility of the parts and otherwise to prevent any particles or other unwanted contaminants from entering the interior chambers of the container bodies 26. Each laminar flow source 33 may be mounted above the barrier enclosure 30 to direct the laminar flow 35 downwardly into the aseptic chamber 32, or the laminar flow source 33 may be mounted to one side of the barrier enclosure 30 to direct the laminar flow 35 laterally (or substantially horizontally) through the aseptic chamber 32. In one embodiment of the present invention, each laminar flow source 33 includes a filter and a fan to produce a filtered airflow into the aseptic or clean enclosure 32. This filtered airflow causes the air pressure within the barrier 30 to be somewhat greater than the air pressure outside the barrier. This pressure differential helps minimize the possibility of airflow into the barrier enclosure, which in turn helps prevent (or at least limit) the possibility that contaminants will get into the barrier enclosure. In some embodiments, the filter is a high efficiency filter such as, for example, a HEPA filter.

The base of the barrier enclosure and the support structures (not shown) are shaped and dimensioned so as to define clearances therebetween. For example, in one embodiment, the clearances are in the form of an approximately three inch gap between the periphery of the base and the perimeter of the support structures. These clearances, or vents, define a flow path through which the filtered airflow provided by the each laminar flow source 33 exits the barrier enclosure 30. The barrier enclosure 30, laminar flow sources 33, vents, and structures located within the barrier enclosure 30 are preferably designed so as to help ensure that the filtered airflow 35 has laminar flow characteristics, or at least generally laminar flow characteristics (as opposed to turbulent flow characteristics), until exiting the barrier enclosure 30. The laminar flow characteristics help keep contaminants from entering the barrier enclosure 30 through the vents and help clear out any dust or contaminants that might happen to get into the enclosure, and thereby help maintain an aseptic or otherwise clean environment within the barrier enclosure.

A container transfer station 34 is mounted within the barrier enclosure 30 for collecting therein the sealed container and stopper assemblies 26. The sealed container and stopper assemblies 26 then may be packaged, such as in trays or boxes, which in turn may be packaged in one or more bags (such as double or triple bags) in a manner known to those of ordinary skill in the pertinent art. Alternatively, the sealed container and stopper assemblies 26 may be fed directly from the transfer station 34 into a needle filling and thermal resealing station 36. The needle filling and thermal resealing station 36 may be located within the same barrier enclosure 30 (or aseptic chamber 32) as the molds 12, 14 and assembly device 24, or may be located within a separate barrier enclosure and aseptic chamber (not shown) that is connected to the first aseptic chamber 32 in order to transfer the sealed container and stopper assemblies 26 thereto.

Figure 3:
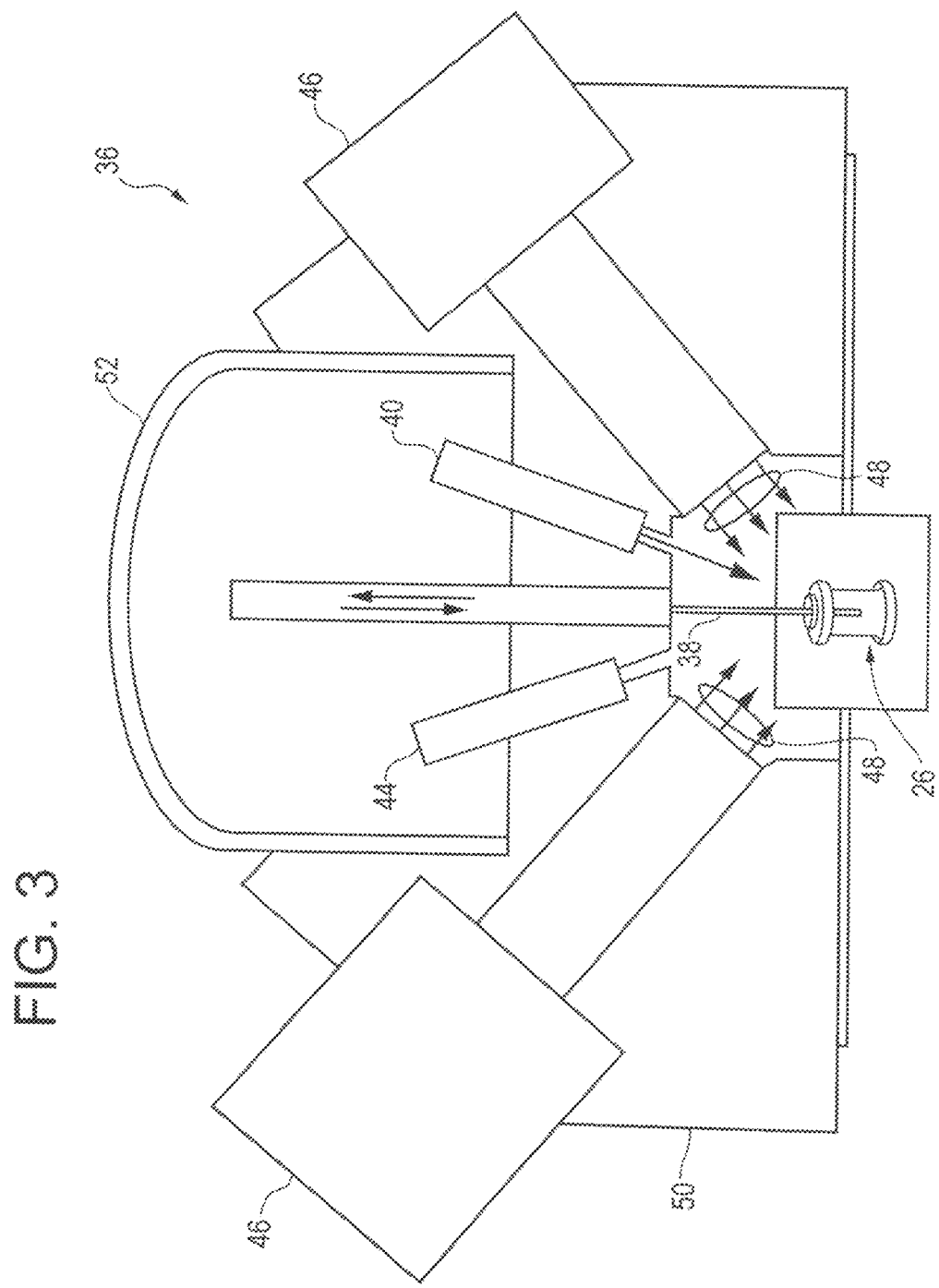
FIG. 3 is a somewhat schematic, cross-sectional view of a needle filling and laser resealing station employed within the apparatus of FIG. 2.

The needle filling and thermal resealing station 36 may include any of the needle filling and thermal resealing apparatus as described in the above-mentioned patent and patent applications and incorporated by reference herein. Accordingly, as shown in FIG. 3, the needle filling and thermal resealing station 36 preferably includes at least one needle 38 coupled in fluid communication with one or more substance sources (not shown), such as a medicament, liquid nutrition product, or other substance to be contained within the container and stopper assemblies 26, and one or more pumps (not shown) for pumping the substance from the substance source, through the needle 38 and into the container chambers; at least one thermal source 40, such as a laser source, fiber optic cable and laser optic assembly for transmitting a beam 42 of laser radiation onto the needle penetrated region of the stopper 22 for sealing the stopper after filling the container; and at least one temperature sensor 44, such as an IR sensor, for sensing the temperature of the sealed surface of the stopper 22 to ensure that the stopper is properly sealed. One or more e-beam sources 46 may be mounted at the needle filling and thermal resealing station 36 for transmitting e-beam radiation 48 onto at least the penetrable surfaces of the stoppers 22, and if desired, onto at least the portions of the needle(s) that contact the stoppers during needle penetration, filling and withdrawal, to ensure sterility of the subject surfaces. The needle 38, laser optic assembly 42, temperature sensor 44 and e-beam sources 46 are mounted on a manifold or support 50 that defines mounting apertures for receiving therein and supporting the components in the illustrated positions relative to each other. A radiation shield 52 of a type known to those of ordinary skill in the pertinent art is mounted above the manifold 50 to prevent the e-beam radiation from passing therethrough, or to prevent an undesirable level of e-beam radiation from passing therethrough, or otherwise to prevent e-beam radiation, or an undesirable level of such radiation from passing out of the needle filling and laser resealing station. As indicated by the arrows in FIG. 3, the needle 38 is drivingly mounted on the manifold 50 and is movable into and out of engagement with the needle penetrable stoppers 22 of the containers 26 transported through the needle filling and laser resealing station 36 to needle fill the containers.

The assembly device 24 may take the form of a robot including, for example, a base that extends upwardly from a mounting flange, a first robotic arm that is pivotally driven on the base, and a second robotic arm that is pivotally driven on top of the first robotic arm. Both robotic arms are pivotally driven within the X and Y coordinate plane. The robot preferably further includes a z-drive that is drivingly mounted on the second robotic arm and drivable in the z-axis. In one embodiment, the robot is a "SCARA" robot sold by Epson Corporation under the model designation "E2S SCARA", such as one of the "E2S clean robots" that is clean room capable (class 10 clean room, for example). One such model is sold by Epson under the model number "E2S451C." However, as may be recognized by those of ordinary skill in the pertinent art based on the teachings herein, these robots are only exemplary, and the robotic assembly device may take the form of any of numerous different robots or other assembly devices that are currently known or that later become known for performing the function of the assembly device 24 as described herein. In addition, the apparatus and/or method of the present invention may employ more than one robot or other assembly device to perform the functions performed by the assembly device 24 and/or to perform additional functions.

In the operation of the apparatus 10, the first and second molds 12 and 14, respectively, are closed and the polymeric compounds forming the stoppers and container bodies are injected or otherwise introduced into the first and second mold cavities 16 and 20, respectively, to mold the container body 18 and stopper 22. Then, once the stopper 22 and container body 18 are molded, the first and second molds 12 and 14 are opened, and the assembly device 24 transfers the stopper 22 from the second mold cavity 20 into the opening formed in the container body 18 located within the first mold cavity 16 to assemble the stopper 22 to the container body 18. Alternatively, the assembly device 24 transfers the container body 18 from the first mold cavity 16 into engagement with the stopper 22 located in the second mold cavity 20 such that the interior portion of the stopper is received within an opening in the container body and forms a fluid-tight seal therebetween. As shown, the sterile, laminar flow 35 is directed into the opening between the molds or mold parts 12 and 14, and over the mold surfaces, assembly device 24 and molded parts 18 and 22, to ensure sterile and/or aseptic conditions and otherwise facilitate in preventing contamination of the molded parts. In one embodiment of the present invention, the robotic assembly device 24 as described above includes a manipulator that engages the stopper 22 and moves the stopper from a first position, wherein the stopper is located within a respective half of the stopper mold cavity 20, to a second position, wherein the stopper 22 is inserted into the opening of the container body 18 located within a respective half of the container mold cavity 16. In another embodiment, the manipulator engages the container body 18 and moves the container body from a first position wherein the container body is located within a respective half of the container mold cavity 16, to a second position, wherein the open end of the container body is inserted into engagement with the interior end of the stopper located within a respective half the stopper mold cavity 20 to assemble the container body to the stopper.

In one embodiment of the present invention, the manipulator is mounted on the z-drive of the above-described robotic assembly device 24. The z-drive is movable along the z-axis, and the robotic arms on which the z-drive is mounted are adapted to move the manipulator in the X and Y coordinate directions. If desired, the z-drive can rotate the manipulator about one or more axes. In one embodiment of the present invention, the manipulator is pneumatically actuated to pneumatically grip the stopper 22 or container body 18 (i.e., by applying a vacuum or suction force through one or more apertures formed in a gripping surface of the manipulator to engage the stopper or container body with such surface) and to move the stopper 22 or container body 18 from the first position to the second position. Then, when the stopper is inserted into the opening or mouth of the container body 18 or vice versa, the suction (or pneumatic force) is released to, in turn, release the manipulator from the stopper. In another embodiment of the present invention, the manipulator includes one or more articulated members that are manipulated between a first position for grasping or otherwise gripping between them the stopper 22 or container body 18, and a second position for releasing the stopper or container body. As may be recognized by those of ordinary skill in the pertinent art based on the teachings herein, the assembly device 24, and the manipulator of the assembly device, may take any of numerous different configurations that are currently known or later become known for performing the function of the manipulator as described herein.

The assembly device 24 assembles the stopper 22 to the container body 18, or vice versa, promptly upon opening the molds 12 and 14 so that the temperature(s) of the stopper and container body are at or above a predetermined temperature. In a currently preferred embodiment of the present invention, the predetermined temperature is sufficiently high to kill any germs, bacteria or other unwanted substances that might render the interior surfaces of the stopper 22 and container body 18 non-sterile, and preferably, the temperature is sufficiently high to maintain all surfaces of the stopper and container body sterile. In one embodiment of the present invention, the predetermined temperature is the temperature of the molded components (i.e., the stopper and container bodies) upon or at the time of opening the molds, or upon or at the time of removing the part from its respective mold cavity. Accordingly, the predetermined assembly temperature of the stopper and container body is greater than an ambient temperature of the apparatus. In a currently preferred embodiment of the present invention, the stopper and container body are at substantially the same temperature when assembled, although the component that is assembled to the other component within its respective mold cavity necessarily will be at a somewhat higher temperature than the other component that is moved from one mold cavity to the other mold cavity for assembly. In one embodiment, the assembly temperature of each of the stopper and container body is within the range of about 80° C. through about 140° C., and is preferably about 80° C. As may be recognized by those of ordinary skill in the pertinent art based on the teachings herein, such predetermined temperatures are only exemplary, and may be changed as desired, or otherwise required or permitted by a particular application.

Because of the significant heat generated during molding, the surfaces of the molds 12 and 14, and thus the surfaces of the stopper 22 and container body 18 upon being released from the molds are sterile. Accordingly, when the stopper 22 and container body 18 are assembled they are sterile, including the interior chamber and all interior surfaces of the stopper and container body. Further, when the hot stopper is inserted into the open end of the hot container body, and vice versa, and particularly when the container body or stopper is located within its respective mold cavity, the seal created between the stopper and the container body facilitates the retention of heat within the interior chamber of the assembled container (or the interior chamber of the container cools down at a slower rate than it would without the stopper because of the thermally insulative properties of the stopper). As a result, the heat and pressure created within the container creates an autoclave effect (i.e., an increase of heat and pressure within the interior of the container as opposed to the exterior of the container), and thus further facilitates maintaining the sterility of the assembled parts. Thus, one advantage of the present invention is that because the stopper 22 and container body 18 are assembled and sealed together within the molding machine or otherwise promptly upon molding the parts and while the parts are still hot, the interiors of the containers remain sterile, even if the exteriors of the containers are subjected to bacteria, germs or other non-sterile contaminants or conditions.

Once the stopper 22 and container body 18 are assembled, the assembly device 24 is withdrawn from between the molds 12 and 14, the assembled stopper and container body 26 is ejected or otherwise removed from the mold 12, the molds are closed, and the molding and assembly process is repeated. Alternatively, the assembly device is used to remove the assembled stopper and container 26 from the mold. The sealed, sterile container and stopper assemblies 26 are then fed into the transfer station 34. In the transfer station 34, locking rings of the type described in the above-mentioned patent and/or patent applications may be assembled to the container body and stopper assemblies 26 to fixedly secure the stoppers 22 to the container bodies 18. In one such embodiment, the locking rings are snapped onto the container bodies. In another such embodiment, the locking rings are fused or welded to the container bodies, such as by ultrasonic welding. In one or both of such embodiments, the locking rings include covers that overly the stopper to prevent tampering with the filled contents and otherwise to cover the stopper. An assembly device, such as a robotic assembly device of the type described above, may be employed to assemble the locking rings to the container bodies. Alternatively, another type of automated assembly fixture equally may be employed. Preferably, the laminar flow source 33 directs a substantially laminar flow 35 of sterile air or other gases over the assembled stopper and container bodies during assembly of the locking rings thereto.

The transfer station 34 may include any of numerous different types of container conveying systems that are currently known or later become known for performing the function of transporting the assembled containers 26 therethrough. For example, the conveying system may include a vibratory feed table or tray or other input device for receiving the assembled containers 26 into the transfer station 34, and one or more conveying systems operatively coupled to the input device for transporting the containers therefrom in a single file or other desired configuration. For example, the conveying system may include a plurality of star wheels for engaging and transporting the containers, as described in the above-mentioned patent applications. Alternatively, the conveying system may include a vibratory feed system, a closed loop conveyor, or a rotatably driven lead screw. As may be recognized by those or ordinary skill in the pertinent art based on the teachings herein, the conveying system may take the form of any of numerous different conveying systems that are currently or later become known.

As may be recognized by those of ordinary skill in the pertinent art based on the teachings herein, the molds 12 and 14 may include a plurality of mold cavities, the apparatus may employ a plurality of molds, and/or the apparatus may employ a plurality of molds wherein each mold has plural cavities and/or the apparatus may employ plural molding machines. In addition, the apparatus need not employ a robot as the assembly device 24, but rather may employ any of numerous different types of assembly devices that are currently known or later become known. For example, the apparatus may employ a first mold for assembling the container bodies and a second mold for assembling the stoppers; and the molded container bodies and/or stoppers may be ejected or otherwise removed from the respective mold in assembly fixtures that are movable relative to each other to either assemble a plurality of container bodies to the corresponding stoppers located at least partially in the respective mold cavities, or vise versa, or to simultaneously assemble multiple stoppers and container bodies.

One advantage of the present invention is that all components of the container and stopper assembly 26 may be molded from thermoplastics or other plastic materials, thus facilitating the manufacture of significantly safer, sterile, pyrogen free containers in comparison to the prior art. Thus, the stoppers and container bodies can be molded in machines, molds and/or mold cavities located side-by-side (or otherwise in close proximity to each other), wherein each molding machine or mold is located under a laminar flow hood (or both machines or molds are located under the same laminar flow hood). Then, the stoppers are assembled and sealed to the respective containers (or vice versa) promptly after molding (and while the containers and stoppers are still hot or at a bactericidal temperature (i.e., a temperature that kills or otherwise prevents the growth or action of microorganisms)) under the laminar flow hood by a suitable assembly device or fixture wherein a plurality of stoppers are brought into engagement with a plurality of containers bodies (or vice versa), or by a pick-and-place robot. As a result, the interiors of the sealed containers are sterile and pyrogen free promptly upon being molded substantially without risk of contamination.

In the needle filling and laser resealing station 36, the containers 26 are fed into the filling and resealing station on a suitable conveyor as described above (not shown), such as a vibratory feed drive, rotatably driven lead screw, or star wheel conveyor, and are indexed through the station to successively fill and reseal each container. Alternatively, the needle filling and laser resealing station 36 may include a robot that includes the needle(s), laser optic assembly, and temperature sensor mounted thereon, as disclosed in the above-mentioned co-pending patent application. In the latter embodiment, the containers may be mounted within trays, and the needle moved from one container to the next within the tray. For each container 26, the needle filling and laser resealing station is operated to drive the needle downwardly to penetrate the stopper and fill the interior chamber of the container with a predetermined volume or weight of medicament or other substance to be contained therein, withdraw the needle from the filled container, laser reseal the needle penetrated region of the stopper, and sense the temperature of the sealed surface to ensure that the needle hole is properly sealed. This process is repeated for each container, or groups of containers where there are plural needles, until all containers are filled and sealed. In the e-beam embodiment as shown typically in FIG. 3, the apparatus need not employ laminar flow in the needle filling and laser resealing station. If, however, the apparatus does not include an e-beam source in the needle filling and laser resealing station, or if the apparatus e-beam sterilizes surfaces of the container prior to moving same into the needle filling and laser resealing station, the apparatus may employ laminar flow in the needle filling and laser resealing station.

In one embodiment, the needle is initially withdrawn at a relatively slow speed to allow the container to fill "bottom-up"; then, when the container is filled, the needle is withdrawn at a relatively faster speed to quickly remove the needle and decrease overall cycle time. In another embodiment, the depth of stroke of the needle is set to reduce or prevent the formation of particles. In one such embodiment, at the bottom of the needle stroke, the needle flow apertures (the needle preferably defines a conically-pointed, non-coring tip (i.e., a "pencil point") with opposing flow apertures extending through opposite sides of the tip) are spaced below the bottom wall of the stopper and adjacent or contiguous thereto (i.e., the upstream end of each hole is adjacent to the inside surface of the bottom wall of the stopper). In one such embodiment, the needle tip penetrates beyond the inside surface of the bottom wall of the stopper to a depth within the range of about 1 to about 5 cm, preferably within the range of about 1 to about 3 cm, and most preferably about 1.5 centimeters. At the bottom of the needle stroke, the substance is delivered therethrough and into the container. Then, when the predetermined amount of substance is delivered, the needle is withdrawn. Preferably, the needle and/or stopper is treated to reduce friction at least at the needle/stopper interface to, in turn, further prevent the formation of particles. In the latter embodiment, the needles are not withdrawn while filling. Rather, the needle penetrates the stopper a minimum amount as indicated above to allow filling while holding the needle in place, for example, at the bottom of the stroke, and then the needle is withdrawn from the stopper after filling. One advantage of this embodiment is that it reduces the relative movement of the needle and stopper surfaces, and thus facilitates in preventing the formation of particles during needle penetration and withdrawal.

As shown in FIG. 2, after the containers are filled and resealed, they are transported to an unloading station in which they are capped and packaged for storage and/or transport.

In the currently preferred embodiments of the present invention, each resealable stopper is formed of a thermoplastic material defining a needle penetration region that is pierceable with a needle to form a needle aperture therethrough, and is heat resealable to hermetically seal the needle aperture by applying laser radiation at a predetermined wavelength and power thereto. Each stopper includes a thermoplastic body defining (i) a predetermined wall thickness in an axial direction thereof, (ii) a predetermined color and opacity that substantially absorbs the laser radiation at the predetermined wavelength and substantially prevents the passage of the radiation through the predetermined wall thickness thereof, and (iii) a predetermined color and opacity that causes the laser radiation at the predetermined wavelength and power to hermetically seal the needle aperture formed in the needle penetration region thereof in a predetermined time period and substantially without burning the needle penetration region and/or the cover portion of the cap (i.e., without creating an irreversible change in molecular structure or chemical properties of the material). In some embodiments, the predetermined time period is approximately 2 seconds, is preferably less than or equal to about 1.5 seconds, and most preferably is less than or equal to about 1 second. In some of these embodiments, the predetermined wavelength of the laser radiation is about 980 nm, and the predetermined power of each laser is preferably less than about 30 Watts, and preferably less than or equal to about 10 Watts, or within the range of about 8 to about 10 Watts. Also in some of these embodiments, the predetermined color of the material is gray, and the predetermined opacity is defined by a dark gray colorant (or pigment) added to the stopper material in an amount within the range of about 0.3% to about 0.6% by weight.

Figure 4:
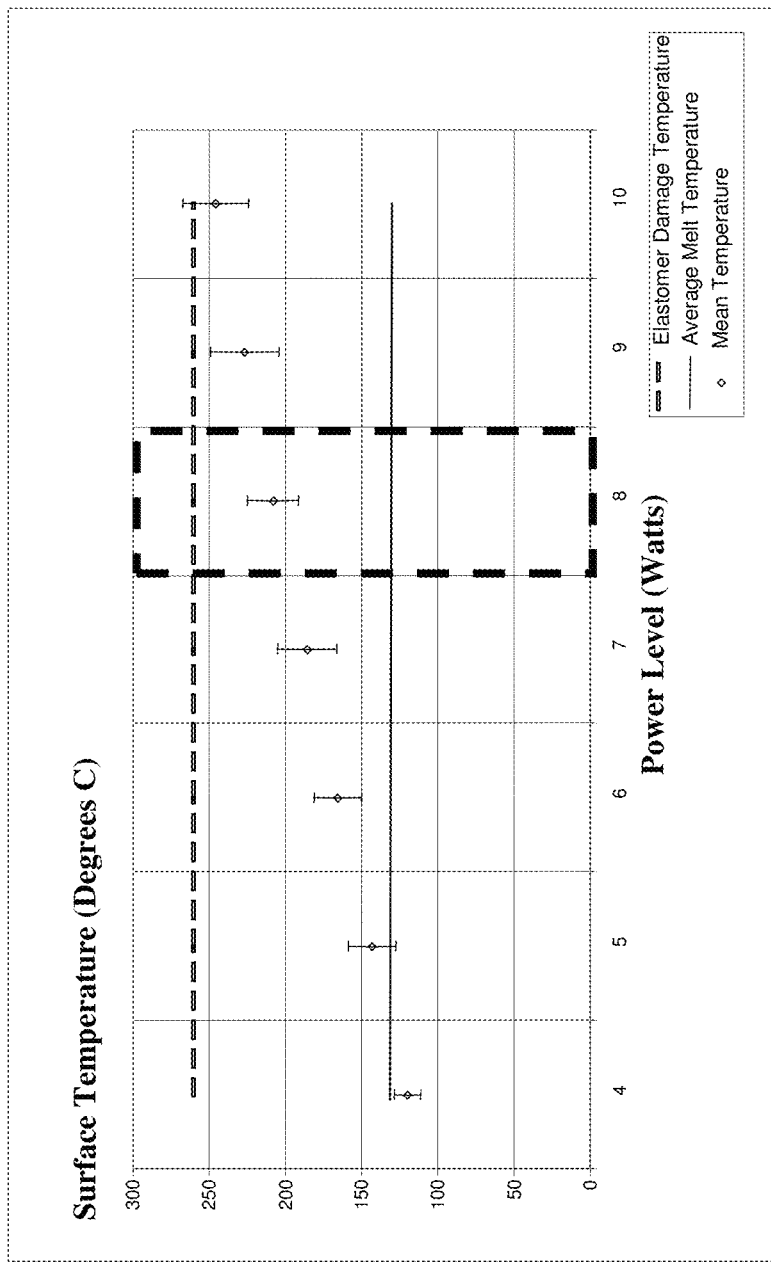
FIG. 4 is a graph illustrating the relationship between the temperature (° C.) of the needle penetrated surface of a plurality of stoppers of the present invention and the power level (Watts) of the laser source used to seal the needle holes in the stoppers.

Preferably, the concentration of pigment and laser power are adjusted to define a predetermined depth of seal of the needle hole such that the elastomer/polymer blend melts without burning. Also, the concentration of pigment and laser power is preferably set to define a surface temperature on the stopper (as measured by the IR sensor) at laser seal that is between the melting temperature of the stopper material (or elastomer/polymer blend) but less than the vaporization temperature of this material. FIG. 4 graphically illustrates in an exemplary manner the relationship between the temperature (° C.) of the needle penetrated surface of a plurality of stoppers of the present invention and the power level (Watts) of the laser source used to seal the needle holes in the stoppers.

The surface temperature of a stopper is a linear function of the laser absorption into the stopper in accordance with the following equation: $\alpha = c \times \rho \times d$, wherein "c" is the concentration of pigment in the material, "$\rho$" is the density of the material, and "d" is the thickness of the material. Accordingly, by selecting an experimental value of $\alpha$ for a known concentration of pigment within the stopper material, the depth of seal for the different concentrations of pigment can be substantially predicted. In one embodiment of the present invention, the surface temperature at laser seal is preferably within the range of about 180 degrees C. to about 220 degrees C., and most preferably within the range of about 180 degrees C. to about 200 degrees C. One advantage of these exemplary temperatures is that there are no visible fumes and the resealed stopper does not have an undesirable burnt appearance. Preferably, the area of the laser spot on the stopper is at least 1.5 times greater than the area of the puncture hole, preferably at least about 2 times greater, and most preferably at least about 2.5 times greater.

Figure 5:
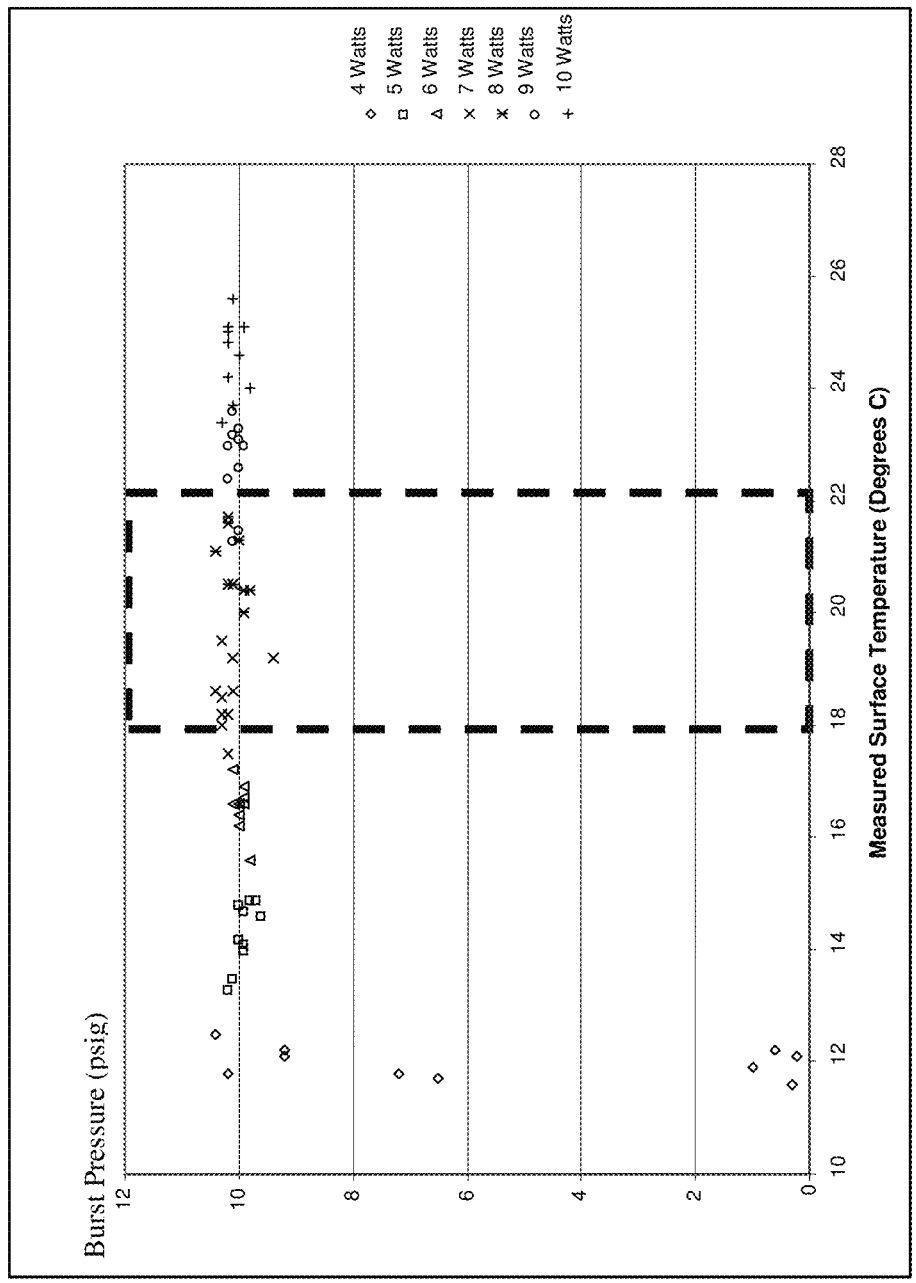
FIG. 5 is a graph illustrating the relationship between the tested burst pressures (psig) and measured surface temperatures (° C.) of the stoppers at laser seal for different laser power settings.

FIG. 5 graphically illustrates in an exemplary manner the relationship between tested burst pressures (psig) and measured surface temperatures (° C.) of the stoppers at laser seal for different laser power settings.

Figure 6:
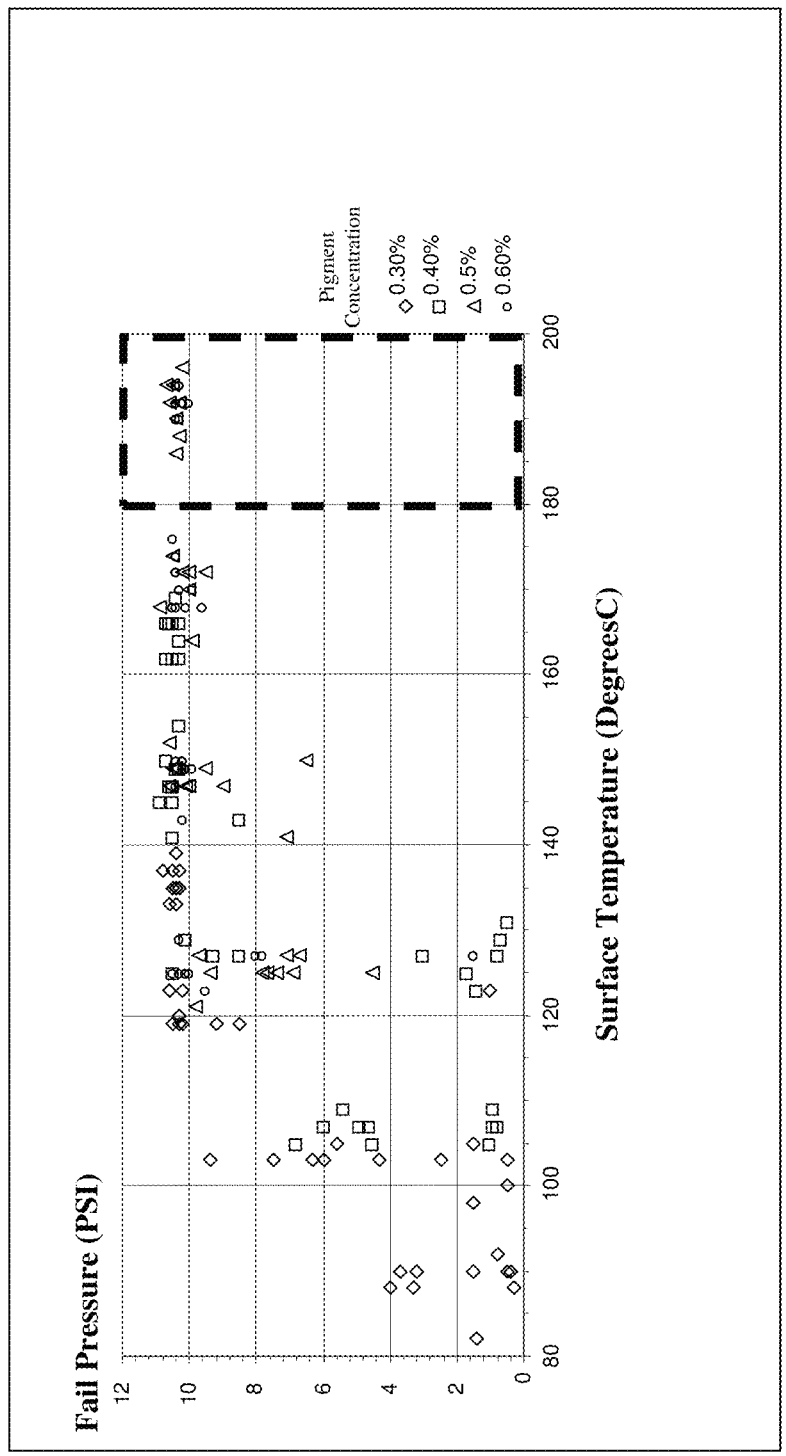
FIG. 6 is a graph illustrating the relationship between the failure pressure (or burst pressure) and the surface temperature of the stoppers at laser seal for different pigment concentrations.

FIG. 6 graphically illustrates in an exemplary manner the relationship between the failure pressure (or burst pressure) and the surface temperature of the stoppers at laser seal for different pigment concentrations (the laser power was about 8 Watts or less).

Figure 7:
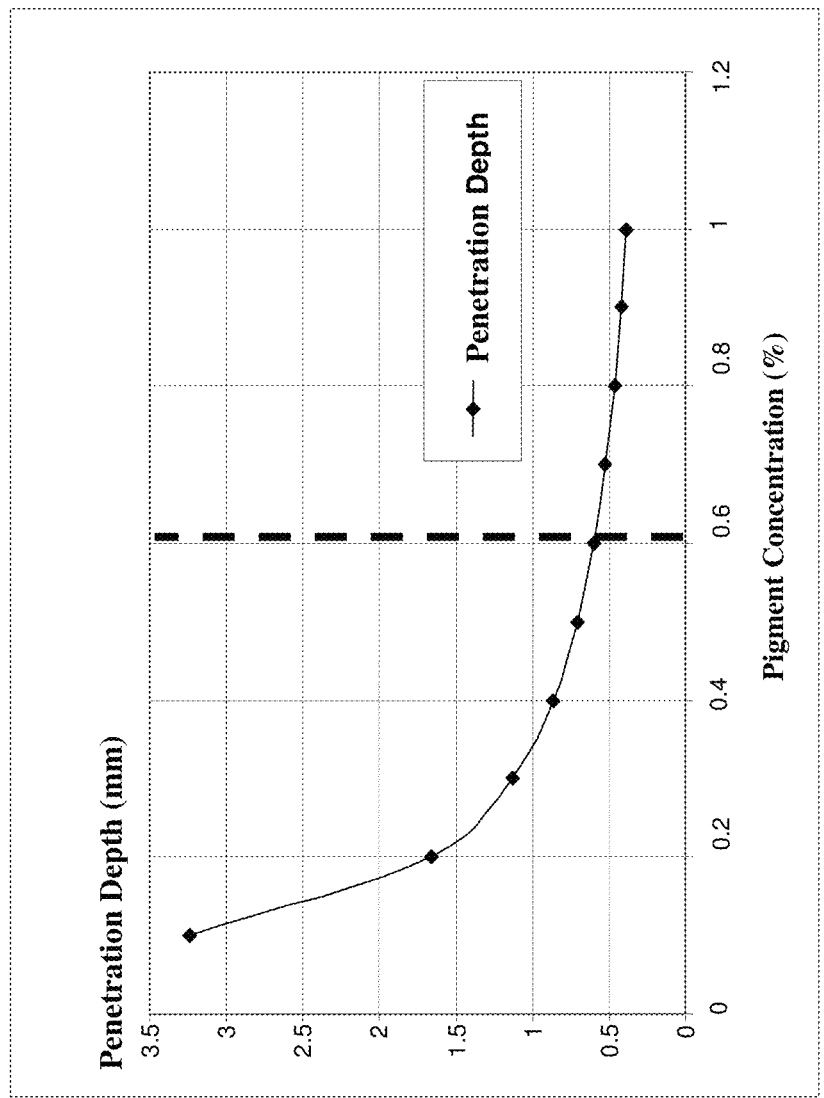
FIG. 7 is a graph illustrating the relationship between a pigment concentration (%) and the depth of seal (or penetration depth).

In accordance with the currently preferred embodiments of the present invention, the pigment concentration and laser power are set to control the depth of seal to, in turn, create a seal having sufficient integrity to not burst or otherwise fail during expected operational conditions. FIG. 7 graphically illustrates in an exemplary manner the relationship between the pigment concentration (%) and the depth of seal (or penetration depth).

As can be seen, the pigment concentration (a dark grey colorant) is preferably within the range of about 0.2 to about 1% (by weight), and most preferably within the range of about 0.4 to about 0.8% (by weight). In a currently preferred embodiment, the pigment concentration is set at about 0.6% to achieve a penetration depth of about 0.55 mm.

If desired, a lubricant of a type known to those of ordinary skill in the pertinent art may be added to or included within each of the above-mentioned thermoplastic compounds, in order to prevent or otherwise reduce the formation of particles upon penetrating the needle penetration region of the thermoplastic portion with the needle. In one embodiment, the lubricant is a mineral oil that is added to the styrene block copolymer or other thermoplastic compound in an amount sufficient to prevent, or substantially prevent, the formation of particles upon penetrating same with the needle or other filling member. In another, the lubricant is a silicone, such as the liquid silicone sold by Dow Corning Corporation under the designation "360 Medical Fluid, 350 CST", or a silicone oil, that is added to the styrene block copolymer or other thermoplastic compound in an amount sufficient to prevent, or substantially prevent, the formation of particles upon penetrating same with the needle or other filling member. In one such embodiment, the silicone oil is included in an amount within the range of about 0.4% to about 1% by weight, and preferably within the range of about 0.4 to about 0.6% by weight, and most preferably within the range of about 0.51 or about 0.5% by weight.

The configuration of the needle that is penetrating the stopper, the friction forces created at the needle/stopper interface, and/or the needle stroke through the stopper also can be controlled to further reduce or substantially prevent the formation of particles upon penetrating the stoppers with the needles. Preferably, the needle/stopper interface is treated to reduce the degree of friction therebetween to further reduce the formation of particles during the needle stroke. In one embodiment of the present invention, the needle is tungsten carbide carbon coated. In another embodiment, the needle is electro-polished stainless steel. In another embodiment, the needle is Teflon coated (although this embodiment gave rise to greater friction forces at the needle/stopper interface than did the tungsten carbide carbon coated embodiment). In yet another embodiment, the needle is titanium coated to reduce friction at the needle/stopper interface. Further, in some embodiments of and as described above, the depth of stroke of the needle is set to further reduce the formation of particles. In one such embodiment, at the bottom of the needle stroke, the needle flow apertures are spaced below the bottom wall of the stopper and adjacent or contiguous thereto (i.e., the upstream end of each hole is adjacent to the inside surface of the bottom wall of the stopper). In one such embodiment, the needle tip penetrates beyond the inside surface of the bottom wall of the stopper to a depth within the range of about 1 to about 5 cm, preferably within the range of about 1 to about 3 cm, and most preferably about 1.5 centimeters.

Also in accordance with a currently preferred embodiment, the needle penetrable and laser resealable stopper comprises: (i) a styrene block copolymer, such as any such styrene block copolymers described above, within the range of about 80% to about 97% by weight (e.g., 95% by weight as described above); (ii) an olefin, such as any of the ethylene alpha-olefins, polyolefins or olefins described above, within the range of about 3% to about 20% by weight (e.g., about 5% as described above); (iii) a pigment or colorant added in an amount sufficient to absorb the laser energy, convert the radiation to heat, and melt the stopper material, preferably to a depth equal to at least about ⅓ to about ½ of the depth of the needle hole, within a time period of less than about 2 seconds, more preferably less than about 1.5 seconds, and most preferably less than about 1 second; and (iv) a lubricant, such as a mineral oil, liquid silicone, or silicone oil as described above, added in an amount sufficient to substantially reduce friction forces at the needle/stopper interface during needle penetration of the stopper to, in turn, substantially prevent particle formation.

Also in accordance with a currently preferred embodiment, in addition to controlling one or more of the above-mentioned parameters to reduce and/or eliminate the formation of particles (i.e., including the silicone oil or other lubricant in the thermoplastic compound, and controlling the configuration of the needle, the degree of friction at the needle/stopper interface, and/or the needle stroke through the stopper), the differential elongation of the thermoplastic components of the resealable stopper is selected to reduce and/or eliminate the formation of particles.

Thus, in accordance with such preferred embodiment, the needle penetrable and laser resealable stopper comprises: (i) a first thermoplastic material within the range of about 80% to about 97% be weight and defining a first elongation; (ii) a second thermoplastic material within the range of about 3% to about 20% by weight and defining a second elongation less than the elongation of the first material; (iii) a pigment or colorant added in an amount sufficient to absorb the laser energy, convert the radiation to heat, and melt the stopper material, preferably to a depth equal to at least about ⅓ to about ½ of the depth of the needle hole, within a time period of less than about 2 seconds, more preferably less than about 1.5 seconds, and most preferably less than about 1 second; and (iv) a lubricant, such as a mineral oil, liquid silicone, or silicone oil as described above, added in an amount sufficient to substantially reduce friction forces at the needle/stopper interface during needle penetration of the stopper to, in turn, substantially prevent particle formation.

Figure 8:
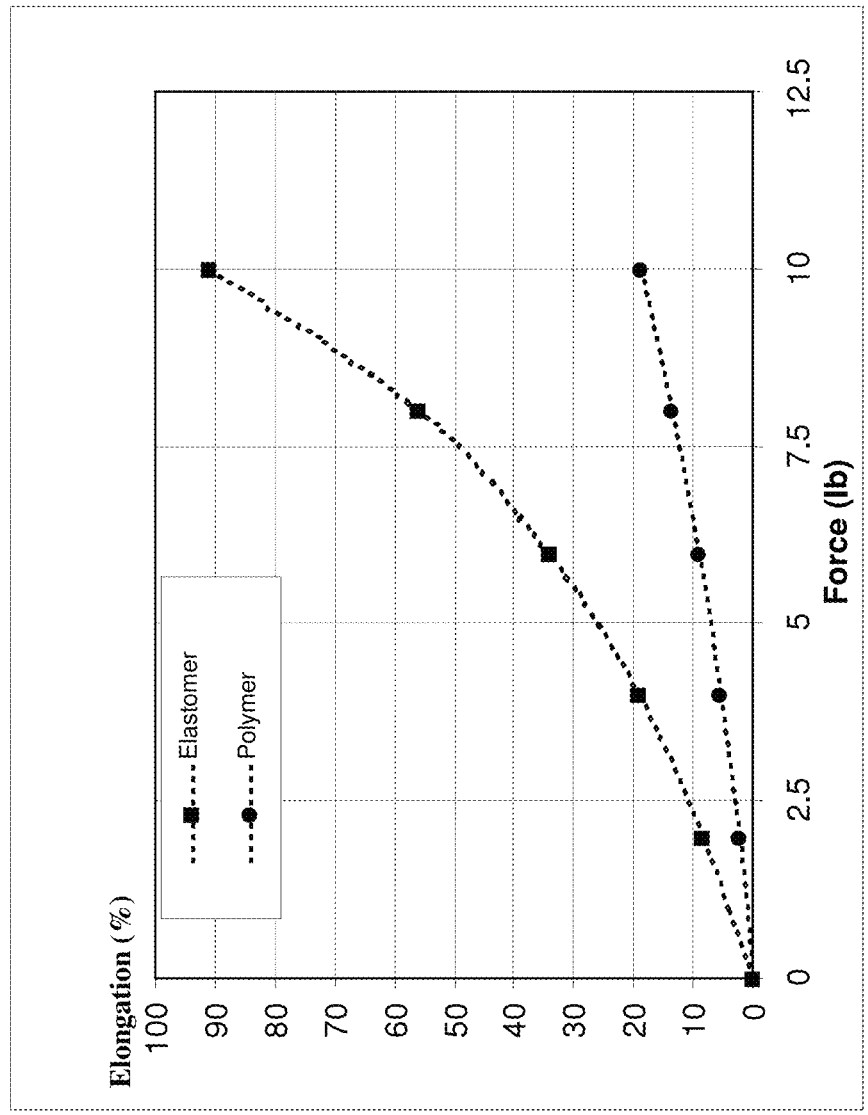
FIG. 8 is a graph illustrating the elongation properties of the first material (Elastomer A) and the second material (Polymer B).

In accordance with a further aspect, the first material defines a lower melting point (or Vicat softening temperature) than does the second material. In some of these embodiments, the first material is a styrene block copolymer, and the second material is an olefin, such as any of a variety of ethylene alpha-olefins or polyolefins. Also in accordance with the currently preferred embodiment, the first material defines an elongation of at least about 75% at 10 lbs force (i.e., the length increases by 70% when subjected to a 10 lb. force), preferably at least about 85%, and most preferably at least about 90%; and the second material defines an elongation of at least about 5% at 10 lbs force, preferably at least about 10%, and most preferably at least about 15%, or within the range of about 15% and about 25%. Exemplary elongation properties of the first material (Elastomer A) and the second material (Polymer B) are graphically illustrated in FIG. 8.

Each of the vials or other container bodies of the present invention may be made of any of numerous different materials that are currently, or later become known for making vials or other dispensers employing resealable stoppers. In some currently-preferred embodiments of the present invention, the containers bodies are made of a thermoplastic material, such as the thermoplastic material sold under the trademark TOPAS by Ticona Corp. of Summit, N.J. In some embodiments of the present invention, the TOPAS material is sold under any of the following product codes: 5013, 5513, 6013, 6015, and 8007, and is a cyclic olefin copolymer and/or cyclic polyolefin.

As may be recognized by those of ordinary skill in the pertinent art based on the teachings herein, the specific formulations of the polymeric compounds used to form the stoppers and the containers of the present invention can be changed as desired to achieve the desired physical characteristics, including sorption (both absorption and adsorption), and moisture-vapor transmission ("MVT"). For example, the wall thicknesses of the container bodies and/or stoppers can be increased or otherwise adjusted in order to provide an improved or otherwise adjusted MVT barrier. Alternatively, or in conjunction with such measures, the blend of components forming the thermoplastic compounds may be changed as desired to meet desired sorption levels with the particular product(s) to be contained within the container, and/or to achieve desired MVT characteristics. Still further, in those embodiments of the resealable stopper employing multiple layers of fusible and infusible materials, the relative thickness of the different materials can be adjusted to, in turn, adjust the MVT characteristics of the stopper. As also may be recognized by those of ordinary skill in the pertinent art based on the teachings herein, the above-mentioned numbers and materials are only exemplary, and may be changed as desired or otherwise required in a particular system.

As may be recognized by those skilled in the pertinent art based on the teachings herein, numerous changes and modifications may be made to the above-described and other embodiments of the present invention without departing from its scope as defined in the appended claims. For example, one or more first mold cavities may be located within a first molding machine, one or more second mold cavities may be located within a second molding machine, and one or both of the first and second molding machines may include a transfer conduit connected between the outlet of the respective mold cavity and an aseptic enclosure for transferring at least one of the molded container body and stopper into the aseptic enclosure and assembling the stopper and container body therein. In addition, the assembly device may be operatively coupled between one or both of the first mold cavity and the second mold cavity and a transfer station or a needle filling and laser sealing station (or like filling station) for transferring assembled stoppers and containers thereto. Still further, the apparatus and method of the present invention may be employed to mold and fill any of numerous different types of containers that may include any of the numerous different configurations of stoppers. In addition, the assembled containers can be filled with any of numerous different products, including pharmaceuticals, such as injectables, ophthalmic, and dermatological products, vaccines, liquid nutrition products and food and beverage products. Accordingly, this detailed description of the preferred embodiments is to be taken in an illustrative, as opposed to a limiting sense.

What is claimed is:

1. A resealable member comprising:
a penetrable region defining a predetermined wall thickness that is penetrable by a filling member and is laser resealable to hermetically seal an aperture therein by applying laser radiation from a laser source at a predetermined wavelength and power thereto;
wherein the penetrable region defines a predetermined color and opacity that absorbs the laser radiation at the predetermined wavelength and causes the laser radiation at the predetermined wavelength and power to seal the aperture in the penetrable region thereof in a predetermined time period;
wherein the color and opacity is defined by a colorant or pigment at a predetermined concentration;
whereby the laser radiation at least one of (a) seals the aperture to a substantially predetermined depth of at least one of the wall thickness and the aperture and (b) raises a surface temperature of the penetrable portion to a substantially predetermined temperature.

2. A resealable member as defined in claim 1, wherein at least one of the power and the concentration are selected so that the laser radiation seals the aperture to the determined depth.

3. A resealable member as defined in claim 1, wherein the predetermined depth provides the penetrable region with sufficient integrity after sealing to not burst or fail during operational conditions.

4. A resealable member as defined in claim 1, wherein the predetermined depth is at least about ⅓ to about ½ of the depth of the at least one of the wall thickness and the aperture.

5. A resealable member as defined in claim 1, wherein at least one of the power and the concentration are selected so that the laser radiation raises the surface temperature to between the melting temperature and the vaporization temperature of the penetrable region.

6. A resealable member as defined in claim 1, wherein at least one of the power and the concentration are selected so that the laser radiation raises the surface temperature to within a range of about 180° C. to about 220° C.

7. A resealable member as defined in claim 1, wherein at least one of the power and the concentration are selected so that the laser radiation seals the aperture substantially without burning the penetrable region.

8. A resealable member as defined in claim 1, wherein at least one of the power and the concentration are selected so that the predetermined time is less than or equal to about 2 seconds.

9. A resealable member as defined in claim 1, wherein the predetermined power is less than or equal to about 10 Watts.

10. A resealable member as defined in claim 1, wherein the laser radiation seals the aperture by melting a portion of the penetrable region, and a melted surface area of the penetrable region is at least about 1.5 times greater than an area of the aperture.

11. A resealable member as defined in claim 1, wherein the concentration is about 0.2 to about 1% by weight.

12. A resealable member as defined in claim 1, wherein the concentration is about 0.6% by weight and the predetermined depth is approximately 0.55 mm.

13. A resealable member as defined in claim 1, wherein the penetrable region comprises at least one of a thermoplastic and an elastomeric material.

14. A resealable member as defined in claim 13, wherein the penetrable region comprises a polymeric blend.

15. A resealable member as defined in claim 1 in combination with a body defining a chamber therein, for sealing a substance within the chamber, wherein the laser radiation forms a gas-tight seal between the resealable portion and the substance in the chamber when applied to the penetrable portion to seal the aperture.

16. A method comprising:
resealing a resealable member comprising a penetrable region defining a predetermined wall thickness that is penetrable by a filling member and is laser resealable to hermetically seal an aperture therein by applying laser radiation from a laser source at a predetermined wavelength and power thereto; wherein the penetrable region defines a predetermined color and opacity that absorbs the laser radiation at the predetermined wavelength and causes the laser radiation at the predetermined wavelength and power to seal the aperture in the penetrable region thereof in a predetermined time period; and wherein the color and opacity is defined by a colorant or pigment at a predetermined concentration;
wherein the resealing step includes applying laser radiation at the predetermined power and wavelength to the penetrable region and at least one of (a) sealing the aperture to a substantially predetermined depth of at least one of the wall thickness and the aperture and (b) raising a surface temperature of the penetrable portion to a substantially predetermined temperature.

17. A method as defined in claim 16, further comprising selecting at least one of the power and the concentration so that the laser radiation seals the aperture to the determined depth.

18. A method as defined in claim 16, further comprising selecting the predetermined depth so that the penetrable region defines sufficient integrity after sealing to not burst or fail during operational conditions.

19. A method as defined in claim 16, further comprising selecting the predetermined depth to be at least about ⅓ to about ½ of the depth of the at least one of the wall thickness and the aperture.

20. A method as defined in claim 16, further comprising selecting at least one of the power and the concentration are so that the laser radiation raises the surface temperature to between the melting temperature and the vaporization temperature of the penetrable region.

21. A method as defined in claim 16, further comprising selecting at least one of the power and the concentration so that the laser radiation raises the surface temperature to within a range of about 180° C. to about 220° C.

22. A method as defined in claim 16, further comprising selecting at least one of the power and the concentration so that the laser radiation seals the aperture substantially without burning the penetrable region.

23. A method as defined in claim 16, further comprising selecting at least one of the power and the concentration so that the predetermined time is less than or equal to about 2 seconds.

24. A method as defined in claim 16, further comprising selecting the predetermined power to be less than or equal to about 10 Watts.

25. A method as defined in claim 16, wherein the resealing step comprises melting a portion of the penetrable region, wherein a melted surface area of the penetrable region is at least about 1.5 times greater than an area of the aperture.

26. A method as defined in claim 16, wherein the concentration is about 0.2 to about 1% by weight.

27. A method as defined in claim 26, wherein the concentration is about 0.6% by weight and the predetermined depth is approximately 0.55 mm.

28. A method as defined in claim 16, wherein the penetrable region comprises at least one of a thermoplastic and an elastomeric material.

29. A method as defined in claim 28, wherein the penetrable region comprises a polymeric blend.

30. A method as defined in claim 16, further comprising:
prior to the step of resealing the resealable member
assembling the resealable member with a body defining a chamber therein and forming a sealed container;
penetrating the penetrable portion with a filling member;
introducing a substance from the filling member through the penetrated penetrable portion and into the chamber of the container; and
withdrawing the filling member from the penetrable portion;
wherein the resealing step includes forming a gas-tight seal between the resealable portion and the substance in the chamber.

\* \* \* \* \*